United States Patent Office 3,823,186
Patented July 9, 1974

3,823,186
ANTIBIOTIC SUBSTANCES
Giancarlo Lancini, Pavia, and Ettore Lazzari and Alberto Diena, Milan, Italy, assignors to Lepetit S.p.A., Milan, Italy
No Drawing. Filed June 23, 1966, Ser. No. 559,749
Claims priority, application Great Britain, July 16, 1965, 30,363/65
Int. Cl. C07c 111/00
U.S. Cl. 260—534 R           1 Claim

ABSTRACT OF THE DISCLOSURE

A chemical process is described for the preparation of a new antibiotic, alanosine, and its homologues, of the formula

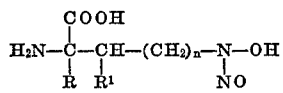

wherein R and R¹ represent hydrogen or a lower alkyl group of 1-8 carbon atoms inclusive and $n$ represents zero or an integer from 1 to 8 inclusive.

---

This invention is concerned with new antibiotic substances and the preparation thereof.

More particularly, this invention relates to a chemical process for preparing the antibiotic alanosine and its homologues, which are represented by the following formula:

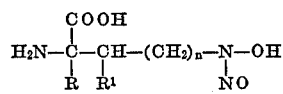

wherein R and R¹ represent hydrogen or a lower alkyl group of 1-8 carbon atoms inclusive and $n$ represents zero or an integer from 1 to 8 inclusive.

This invention provides also new useful substances, represented by the above general formula in which $n$ represents an integer from 0 to 8.

It will be appreciated by those skilled in the art that the substances of the above formula, which are alpha-amino acids, may exist both in racemic and optically active forms. This application is directed, to all possible stereoisomeric forms of the substances.

The new chemical process is in accordance with the following reaction scheme:

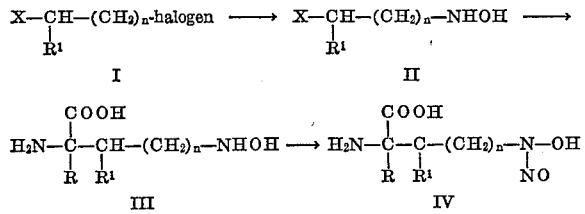

In the above formulae R, R¹ and $n$ are as defined above and X represents one of the following groups:

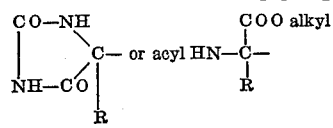

wherein R is as defined above.

According to the process a mixture of a halogenated hydantoin or acylamidoester of Formula I with at least 2 equivalent molecular amounts of anhydrous hydroxylamine is allowed to react for 0.5 to 5 hours, if desired in the presence of a solvent, at a temperature between about 40° C. and the boiling point of the solvent, when present.

After cooling, concentrated hydrochloric acid is added and the mixture is heated at 90–120° C. for 0.5–12 hours.

After evaporation to dryness the residue is dissolved in water and adjusted to about neutral pH. After addition of a water miscible solvent in which the hydroxylamino compound is insoluble, this precipitates out. This compound (Formula III) is then reacted with an equivalent amount of an alkali metal nitrile in acidic aqueous medium at a temperature between about —10° and 5° C.

It will be apparent that the process of the present invention provides a comparatively simple way for the chemical preparation of the antibiotic alanosine, i.e. L-(—)-2-amino-3-nitrosohydroxylamino-propionic acid. The preparation by fermentation of Str. alanosinicus n. sp. ATCC 15710 is described in our copending application Ser. No. 470,884, filed July 9, 1965. The present application relates therefore to the first chemical synthesis of alanosine.

The compounds of this invention show a very high degree of activity in inhibiting growth of fly larvae (Musca domestica). For instance, the racemic and the L-form of 2-amino-3-(hydroxynitrosamino)-propionic and 2-amino-3-(hydroxynitrosamino)-butyric acid, when added to a liquid diet of house fly larvae at a concentration lower than 0.1 percent, caused complete inhibition of growth.

Some of the compounds are also fungicides. As an example, L-2-amino-3-(hydroxynitrosamino)-propionic acid was very active against foliage fungi, such as fungus-apple scab, tomato late blight and lettuce downy mildew.

The following non-limitative examples illustrate the invention.

EXAMPLE 1

DL-Alanosine (DL-2-amino-3-nitrosohydroxyamino-propionic acid)

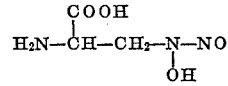

An intimate mixture of 10 g. of methyl alpha-acetamido-beta-chloropropionate and 20 g. of hydroxylamine is gently heated until fusion is complete; at this point a strong heat evolution occurs and the mass must be externally cooled until heat evolution subsides. After 4 hours at room temperature concentrated hydrochloric acid is cautiously added and the mixture is heated for 2 hours on a boiling water bath. To eliminate excess hydroxylamine, the mixture is evaporated to dryness and the residue is dissolved in a water-acetone mixture adjusted to pH about 5 with sodium acetate. After standing some hours the mixture is extracted with diethyl ether, the aqueous layer is evaporated to dryness and the residue extracted with methanol. The methanol solution is then evaporated to dryness, the residue is dissolved in water and ammonia is added to alkaline reaction. The precipitate is collected and dried. Yield 4.7 g. (70.3%) of alpha-amino-beta-hydroxylaminopropionic acid, m.p. 160–161° C.

Into a solution of 2 g. of alpha-amino-beta-hydroxylamino-propionic acid in 25 ml. of water and 1 ml. of acetic acid, a solution of 1.15 g. of sodium nitrite in 1 ml. of water is added dropwise at 0° C., followed by 0.5 ml. of acetic acid. The precipitate is collected and dried. Yield 1.8 g. (72.5%) of DL-alanosine, m.p. about 185° C. (dec.).

EXAMPLE 2

2-Amino-4-nitrosohydroxylaminobutyric acid

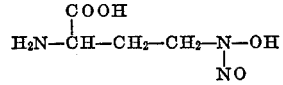

A mixture of 25 g. of 5-(2-bromoethyl)hydantoin and 15 g. of hydroxylamine is fused and then allowed to stand for 2 hours. A water-actone mixture is then added, followed by sodium acetate to pH about 5. After some hours the pH is adjusted to about 6.5 with NaOH and the acetone oxime so formed is extracted with diethyl ether. The water solution is made acidic with HCl and concentrated to dryness. The residue is extracted with ethanol, filtered and the filtrate evaporated to dryness. The residue is dissolved in water, filtered through a column of Dowex 50W in acid form and eluted with 5 percent aqueous HCl. The fractions of the eluate giving positive reaction with triphenyltetrazole are combined and evaporated to dryness, and the residue is crystallized from ethanol-diethyl ether. Yield 3.4 g. (64%) of 5 - (2 - hydroxylaminoethyl)-hydantoin hydrochloride, m.p. 155–157° C.

A mixture of 5.2 g. of 5 - (2-hydroxylaminomethyl)-hydantoin hydrochloride and 300 ml. of concentrated hydrochloric acid is treated at 120° C. in a closed vessel for 12 hours. After evaporation to dryness the residue is passed through Dowex 50WX4 and eluted with 5 percent HCl.

The fractions giving a positive triphenyltetrazole test are combined and evaporated to dryness and the residue is dissolved in methanol and treated with two equivalent amounts of 5N sodium hydroxide. 2 - Amino - 4 - hydroxylaminobutyric acid precipitates out and is collected and dried. Yield 2.8 g., m.p. 145–147° C. The mono-hydrochloride has m.p. 121–123° C.

A solution of 3.2 g. of the amino acid in 20 ml. of N HCl is treated at about 0° C. with 1.47 g. of solid NaNO₂, added in portions. At the end of the addition 20 ml. of ethanol are added and the precipitate is collected. Yield 3.2 g. (92%) of 2-amino-4-nitrosohydroxylaminobutyric acid, m.p. 183–185° C.

EXAMPLE 3

2-Amino-6-nitrosohydroxylaminohexanoic acid

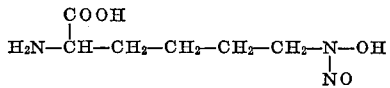

A mixture of 19 g. of 5-(4-bromobutyl)-hydantoin and 60 g. of hydroxylamine is fused as described in the preceding Examples, and the excess hydroxylamine is removed as therein indicated through the formation of acetone oxime. Yield 14.6 g. (80.4%) of 5-(4-hydroxylaminobutyl)-hydantoin hydrochloride, m.p. 147–149° C.

A solution of 3 g. of 5-(4-hydroxylaminobutyl)-hydantoin hydrochloride in 250 ml. of concentrated HCl is heated at 120° C. for 12 hours in a closed vessel. By working exactly as described in Example 2, a yield of 1.9 g. of 2-amino-6-hydroxylaminohexanoic acid is obtained, m.p. 197–200° C.

A solution of 11.5 g. of the above amino acid in 65 ml. of N HCl is treated with 4.45 g. of solid NaNO₂ added in small portions at —5° C. At the end of the addition 80 ml. of ethanol are added and the precipitate is collected. Yield 8.5 g. (69%) of 2-amino-6-nitrosohydroxylaminohexanoic acid, m.p. 182–183° C.

EXAMPLE 4

By a process analogous to that described in the preceding Examples 2-amino-2-methyl-3-nitrosohydroxyaminopropionic acid is prepared. The formula is:

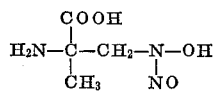

EXAMPLE 5

By a process analogous to that described in the preceding Examples 2-amino-3-nitrosohydroxylaminobutyric acid is prepared. The formula is:

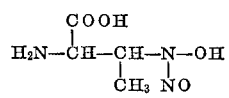

What we claim is:
1. The racemate of the compound having the formula

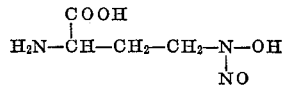

References Cited

UNITED STATES PATENTS

| | | | |
|---|---|---|---|
| 3,676,490 | 7/1972 | Thiemann et al. | 260—534 |
| 2,954,314 | 9/1960 | Metzger et al. | 260—583 X |
| 3,244,733 | 4/1966 | Wakasa et al. | 260—534 X |

OTHER REFERENCES

Greenstein et al., Chemistry of Amino Acids, volume 3, p. 2015, 1961.

Derwent Pharmaceuticals Documentation, 20120, Feb. 25, 1966.

Badische Anilin etc., Chem. Ab. Vol. 54: 3270–71 (1960).

Traube, Chemische Berichte, 28 1895, p. 2297.

Roberts et al., Organic Chemistry, p. 666, 1964.

LORRAINE A. WEINBERGER, Primary Examiner

R. GERSTL, Assistant Examiner

U.S. Cl. X.R.

260—309.5, 482 R; 424—319